United States Patent [19]

Sakai

[11] Patent Number: 4,882,959
[45] Date of Patent: Nov. 28, 1989

[54] HAND TOOL

[75] Inventor: Yuichi Sakai, Sanjo, Japan

[73] Assignee: Top Kogyo Co., Ltd., Sanjo, Japan

[21] Appl. No.: 265,825

[22] Filed: Oct. 31, 1988

[51] Int. Cl.$^4$ .............................................. B25B 7/06
[52] U.S. Cl. ........................................ 81/416; 30/266;
403/160
[58] Field of Search .................................. 81/415–417;
30/266, 270; 403/91, 102, 104, 110, 119, 147,
160, 358

[56] References Cited

U.S. PATENT DOCUMENTS 2,596,767  5/1952  Erickson ............................... 30/266

3,602,074  8/1971  Smith ..................................... 81/416

Primary Examiner—James G. Smith
Attorney, Agent, or Firm—Spencer & Frank

[57] ABSTRACT

A hand tool having two arms pivotable about an axis, including a frusto-conical hole which extends continuously through both of the arm members and has a large diameter end and a smaller diameter end. A frusto-conical tapered pin is inserted into the large diameter end of the hole and a fixing member for engaging the tapered pin is inserted into the smaller diameter end of the hole. Once the pin is engaged by the fixing member, the arm members are pivotable about the common axis of the hole, the tapered pin and the fixing member.

10 Claims, 3 Drawing Sheets

HAND TOOL

BACKGROUND OF THE INVENTION

This invention relates to a tool of the type composed of a pair of mutually pivotable arm members such as cutting nippers, cutting pliers, round nose chain pliers with side cutters, scissors, pliers and pincers.

Conventionally, a tool of this type is assembled by inserting a cylindrical pin into through-holes provided at the fastening positions of a pair of two arm members and tightening a screw on the other end of the cylindrical pin which protrudes from the other side of the two arm members. As the arm members pivot about the pin-screw play is generated, unless the holes are precisely finished to a predetermined size. This play makes it difficult for the tool blades to be brought to the correct positions for their intended purpose. Japanese Utility Model Publication No. 30045/1983 discloses scissors in which any play of the nut is eliminated by augmenting the friction of coefficient between the nut and the washer through the association of a nut having a tapered peripheral surface and a washer having an end plate disposed at an angle of tape approximately the same as that of the above tapered peripheral surface.

In the tools discussed above, the nut and the washer are arranged in the tapered hole, which is only made in one member, so that the nut receives a screw. Even in this structure, a certain amount of play will be generated in the manner mentioned above unless the finish between the hole and the screw in the other arm member is precise.

Japanese Patent Publication No. 1082/1984 discloses a hand tool in which a tapered pin has a caulked pivoting portion which is associated with a tapered hole.

However, play is not eliminated in this tool either, because the tapered surfaces of the members are discontinuous. In addition, this hand tool is hard to repair because of its caulking structure.

SUMMARY OF THE INVENTION

An object of this invention is to provide a tool which is free from the above-mentioned problems of play and which is easy to repair when a certain amount of play is generated due to the long use.

A hand tool in accordance with this invention comprises a pair of arm members having respective tapered holes provided in the fastening portion between the pair of members, a tapered pin which is fitted into the tapered holes and a fixing member inserted into the tapered holes from the smaller-diameter portions thereof which engages the tapered pin.

In the above-described structure, the tapered pin is slidably engaged with the tapered holes, so that the pivoting of the two arm members does not involve any play.

DETAILED DESCRIPTION OF EMBODIMENTS

Figure 1:
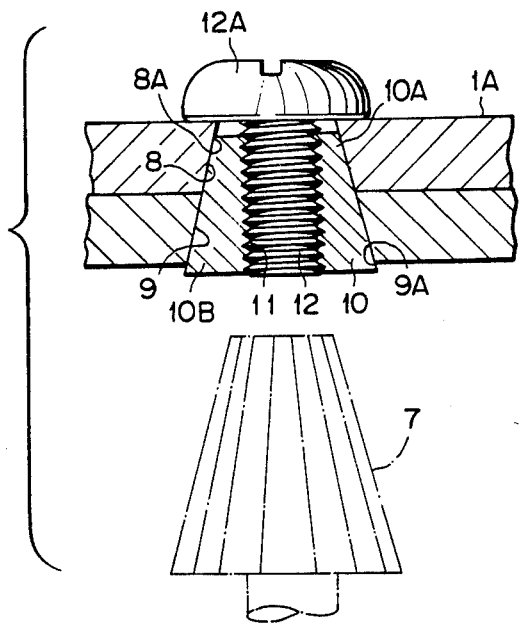
FIG. 1 is a sectional view showing a first embodiment of a hand tool according to the present invention, taken along a line A—A of FIG. 2.
Figure 2:
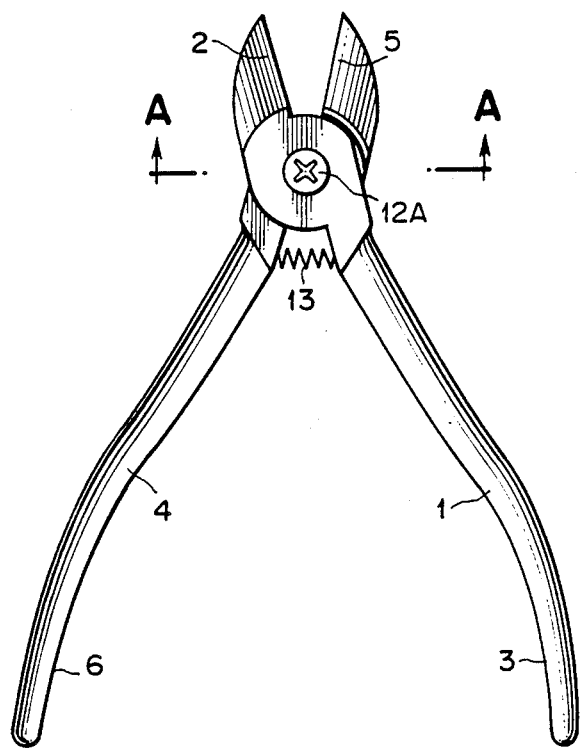
FIG. 2 is a plan view of the hand tool shown in FIG. 1.

FIGS. 1 and 2 show a pair of cutting nippers which constitute the first embodiment of the present invention. The cutting nippers include a first arm member 1 having a blade 2 at the tip and a handle 3 at the rear portion and a second arm member 4 having a blade 5 opposed to the blade 2 and a handle 6 at the rear portion. First and second tapered holes 8 and 9 have the same taper and together form a continuous frusto-conical hole through both arm members 1 and 4. After being connected with each other at the fastening portions of the arm members 1 and 4, the holes are finished by means of a reamer 7.

The cutting nippers further include a frusto-conically shaped tapered pin 10 which is fitted into the first and second tapered holes 8 and 9. The tapered pin 10 includes a female screw 11 formed along the central axis thereof. A smaller-diameter portion 10A of this tapered pin 10 is larger than a smaller-diameter end or portion 8A of the first tapered hole 8, and a larger-diameter portion 10B of the tapered pin 10 is larger than a larger-diameter end or portion 9A of the second tapered hole 9. The smaller-diameter portion 10A of the tapered pin 10 is provided in a position somewhat lower than an upper surface 1A of the first arm member 1.

A male screw 12 which constitutes the fixing member is engaged with said tapered pin 10 from the side of the smaller-diameter portion 8A of the first tapered hole 8. The head 12A of the screw 12 has a diameter larger than that of the smaller-diameter opening 8A, and is locked against the first arm member 1. Further, a spring 13 (FIG. 2) is provided between the handle portions of the first and second arm members 1 and 4.

After the first and second arm members 1 and 4 have been fastened to each other and the tapered pin 10 inserted into the first and second tapered holes 8 and 9, the male screw 12 is inserted into the tapered holes from the side of the smaller-diameter portion 8A. The male screw 12 engages the female screw 11, thereby allowing the first and second arm members 1 and 4 to pivot relative to each other. By thus pivoting the pair of arm members 1 and 4 about the axis of the tapered pin 10, a uniform sliding can be effected between the tapered pin 10 and the first and second tapered holes 8, 9, which inhibits any generation of play. Any looseness generated between the first and second arm members 1 and 4 can be removed by re-tightening the screw 12, which draws the second arm member 4 to the side of the first arm member 1, i.e., the former is pressed against the latter. This eliminates any looseness between the arm members. By thus forming the first and second tapered holes 8 and 9 which are connected to each other in the fastening portion of the first and second arm members 1 and 4, fitting the tapered pin 10 into these tapered holes 8 and 9, and engaging the screw 12 with the tapered pin 10, the tapered pin 10 normally slides inside the tapered holes 8 and 9, which eliminates any play between them. Further, since the tapered pin 10 can be fitted into the first and second tapered holes 8 and 9, any small errors in size between the tapered holes 8 and 9 can be absorbed.

Further, as described above, the smaller-diameter portion 10A of the tapered pin 10 has a diameter larger than that of the smaller-diameter portion 8A of the first tapered hole 8, thereby forming a clearance between the tapered pin 10 and the head portion 12A of the screw 12. This makes it possible to re-tighten the screw 12 so as to eliminate any looseness between the first and second arm members which may be generated when the first and second tapered holes become worn after long use.

Figure 3:
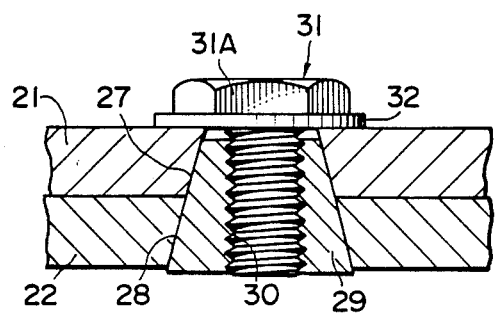
FIG. 3 is a sectional view showing a second embodiment of a hand tool according to the present invention, taken along a line A—A of FIG. 4.
Figure 4:
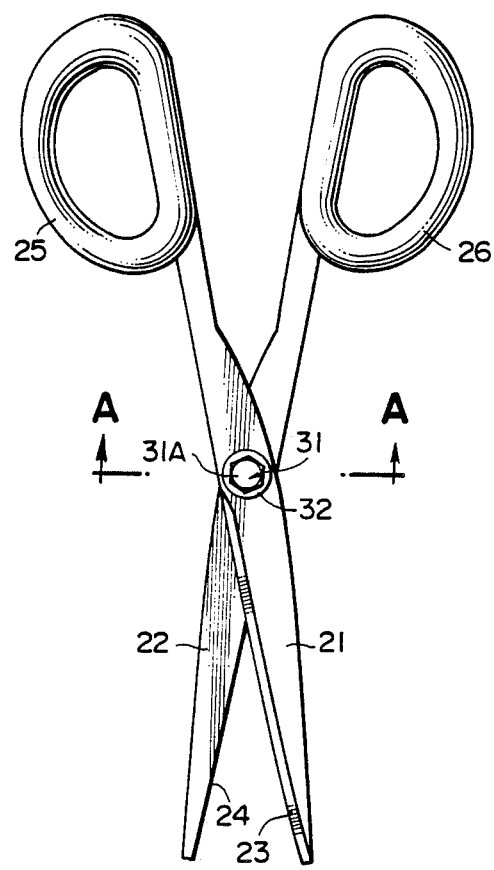
FIG. 4 is a plan view of the hand tool shown in FIG. 3.

FIGS. 3 and 4 show a pair of scissors which constitute the second embodiment of this invention. The scissors include first and second arm members 21, 22 having blades 23 and 24 at the tip and handles 25 and 26 at the rear end portion, respectively. First and second tapered holes 27 and 28 are formed and connected to each other in the fastening portion of these first and second arm members 21 and 22. The scissors further include a tapered pin 29 that is fitted into the first and second tapered holes 27 and 28. This tapered pin 29 includes a female screw 30 formed along the axis thereof. A bolt 31 which constitutes the fixing member is engaged with the female screw 30 and a head 31A of the bolt 31 is locked against the first arm member 21. A washer 32 is provided between the bolt 31 and the first arm member 21 for preventing any looseness between them.

Pivoting can accordingly be provided without any play occurring, because the tapered pin 29 with the tapered surface slides within the first and second tapered holes 27 and 28.

Figure 5:
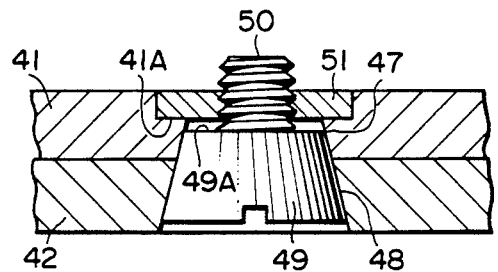
FIG. 5 is a sectional view showing a third embodiment of a hand tool according to the present invention, taken along a line A—A of FIG. 6.
Figure 6:
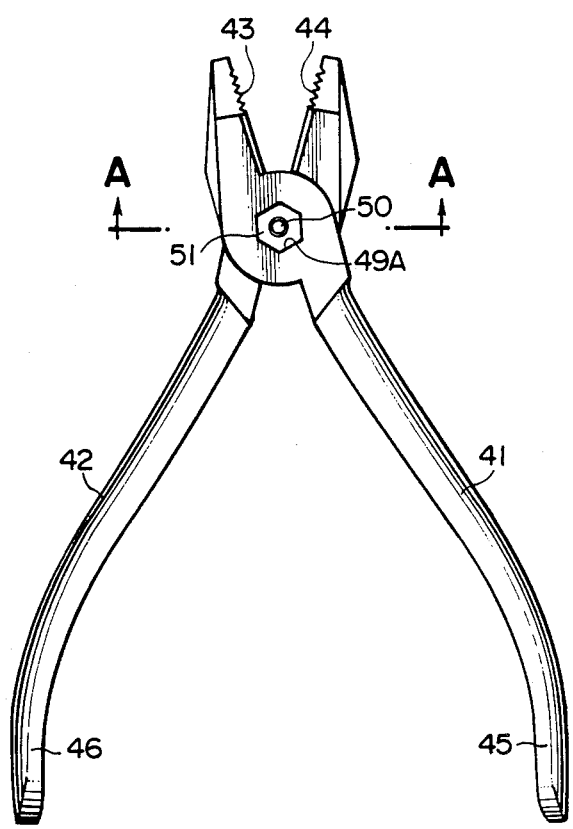
FIG. 6 is a plan view of the hand tool shown in FIG. 5.

FIGS. 5 and 6 show a pair of cutting pliers which constitute the third embodiment of this invention. The cutting pliers include first and second arm members 41 and 42 having clipping portions 43 and 44 at the tip and handles 45 and 46 at the rear portions, respectively. First and second tapered holes 47 and 48 are formed in the fastening portion of these arm members 41 and 42. A tapered pin 49 is fitted into the first and second tapered holes 47 and 48. An upright male screw 50 is formed at the center of a smaller-diameter portion 49A of this tapered pin 49. A nut 51 having a female screw thread is engaged with the male screw 50 and is locked in the recess 41A formed in the upper surface of the first arm member 41.

The first and second arm members 41 and 42 can accordingly be mutually pivoted by fitting the tapered pin 49 into the first and second tapered holes 47 and 48 and engaging the nut 51 with the male screw 50.

The present invention is not to be construed as being restricted to the above-described embodiments. It can be applied to any tool which consists of a pair of arm and other members that are mutually pivoted such as round nose chain pliers, side cutters, pliers, and pincers.

As described above, the present invention makes it possible to pivot a pair of arm members without any play by forming tapered a continuous hole through the arm members, fitting a tapered pin into this tapered hole, and inserting a fixing member adapted to be engaged with the tapered pin into the smaller-diameter opening of the tapered hole.

What is claimed is;

1. A hand tool with two pivoted arms comprising:
   a pair of arm members having respective handles at the rear ends thereof, pivoting through-holes formed in said arm members, each said through-hole having a large-diameter portion and a smaller-diameter portion, the large-diameter portion of a first said through-hole adjoining the smaller-diameter portion of a second said through-hole so that together said through-holes form a continuous tapered surface extending through both of said arm members;
   a frusto-conical tapered pin inserted into the large-diameter end of said second pivoting through-hole and having an axis common to that of said through-holes; and
   a fixing member inserted into the smaller-diameter portion of said first pivoting through-hole engaged with the tapered pin.

2. A hand tool as claimed in claim 1, wherein the tapered pin is engaged with the fixing member by means of a female screw formed in the tapered pin and a male screw which constitutes the fixing member, and which has a head portion having a diameter larger than the diameter of the smaller-diameter portion of said first through-hole.

3. A hand tool as claimed in claim 1, wherein the tapered pin is engaged with the fixing member by means of a female screw formed in the tapered pin and a male screw which constitutes the fixing member, said fixing member being inserted through a washer and the smaller-diameter portion of said first through-hole.

4. A hand tool as claimed in claim 1, wherein the tapered pin has a large-diameter and a smaller-diameter portion and is engaged with the fixing member by means of a male screw formed in said smaller-diameter portion of the tapered pin, and wherein the fixing member constitutes a nut which is locked rotational limitation in a recess adjoining the smaller-diameter portion of said first through-hole.

5. A hand tool having arm members pivotable about an axis, comprising:
   a pair of arm members;
   a frusto-conical hole which extends continuously through both of said arm members, said frusto-conical hole having a large diameter end and a smaller diameter end;
   a frusto-conical tapered pin inserted into the large diameter end of said frusto-conical hole; and
   a fixing member engaging said tapered pin inserted into the smaller diameter end of said frusto-conical hole, whereby said arm members are pivotable about an axis common to said hole, said tapered pin and said fixing member.

6. The hand tool of claim 5, wherein said fixing member includes a male screw and said tapered pin includes a female screw for threadably engaging said male screw.

7. The hand tool of claim 6, wherein said fixing member includes a head portion which is larger in diameter than said smaller diameter end of said frusto-conical hole.

8. The hand tool of claim 7, wherein a washer is interposed between said head portion and said smaller diameter end of said frusto-conical hole.

9. The hand tool of claim 5, wherein:
   said frusto-conical hole includes a disc-shaped recess adjacent to the smaller diameter end of said frusto-conical hole for receiving said fixing member;
   said tapered pin includes a large diameter portion and smaller diameter portion, said smaller diameter portion having a male screw member extending therefrom; and
   said fixing member comprises a nut having a female screw for threadably engaging said male screw member.

10. The hand tool of claim 5 wherein,
said tapered pin includes a large diameter portion and a smaller diameter portion, said smaller diameter portion of said pin is larger in diameter than the smaller diameter end of said hole and said large diameter portion of said pin is larger in diameter than the large diameter end of said hole.

* * * * *